United States Patent
Venkatanarayanan et al.

(10) Patent No.: US 11,435,955 B1
(45) Date of Patent: Sep. 6, 2022

(54) SYSTEM AND METHOD FOR OFFLOADING COPY PROCESSING ACROSS NON-VOLATILE MEMORY EXPRESS (NVME) NAMESPACES

(71) Applicant: EMC IP Holding Company, LLC, Hopkinton, MA (US)

(72) Inventors: Prakash Venkatanarayanan, Bangalore (IN); David Lionel Black, Acton, MA (US); Dmitry Tylik, Westborough, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 17/231,326

(22) Filed: Apr. 15, 2021

(51) Int. Cl.
*G06F 12/00* (2006.01)
*G06F 3/06* (2006.01)

(52) U.S. Cl.
CPC .......... *G06F 3/0659* (2013.01); *G06F 3/0605* (2013.01); *G06F 3/067* (2013.01); *G06F 3/0653* (2013.01); *G06F 3/0679* (2013.01)

(58) Field of Classification Search
CPC ................. G06F 3/0679; G06F 3/067
See application file for complete search history.

(56) References Cited

U.S. PATENT DOCUMENTS

| | | | |
|---|---|---|---|
| 7,496,718 B2 * | 2/2009 | Ohno | G06F 3/067 711/163 |
| 2005/0229021 A1 * | 10/2005 | Lubbers | G06F 11/2069 714/2 |
| 2010/0049821 A1 * | 2/2010 | Oved | G06F 9/542 709/212 |
| 2014/0380005 A1 * | 12/2014 | Furuya | G06F 3/0619 711/162 |
| 2017/0139607 A1 * | 5/2017 | Malkin | G06F 3/0688 |
| 2021/0216569 A1 * | 7/2021 | David | G06F 3/0683 |

* cited by examiner

*Primary Examiner* — Baboucarr Faal
(74) *Attorney, Agent, or Firm* — Brian J. Colandreo; Mark H. Whittenberger; Holland & Knight LLP (57) ABSTRACT

A method, computer program product, and computing system for receiving, at a host computing device, a request to copy data from a source Non-Volatile Memory Express (NVMe) namespace directly accessible by a source storage controller to a destination NVMe namespace directly accessible by a destination storage controller and may determine whether the destination storage controller can directly access the source NVMe namespace. In response to determining that the destination storage controller cannot directly access the source NVMe namespace, a first identifier associated with the data may be generated via the source storage controller. The first identifier may be provided to the host computing device. A data handle associated with the first identifier may be generated via the destination storage controller. The data may be copied, via the destination storage controller, from the source NVMe namespace to the destination NVMe namespace based upon, at least in part, the data handle.

20 Claims, 6 Drawing Sheets

SYSTEM AND METHOD FOR OFFLOADING COPY PROCESSING ACROSS NON-VOLATILE MEMORY EXPRESS (NVME) NAMESPACES

BACKGROUND

Storing and safeguarding electronic content may be beneficial in modern business and elsewhere. Accordingly, various methodologies may be employed to protect and distribute such electronic content.

As multiple storage systems with multiple storage arrays allow client devices to perform various types of operations, data may be moved between various storage spaces within and across the multiple storage arrays. Non-volatile Memory Express (NVMe) is a storage protocol that provides access to storage locations called namespaces. However, when utilizing NVMe for copy operations across namespaces and across NVM subsystems, conventional copy commands require a host computing device to read the data from a source storage location and write the data from the host computing device to a target storage location. Accordingly, the use of a host computing device to perform copy operations between namespaces is inefficient.

SUMMARY OF DISCLOSURE

In one example implementation, a computer-implemented method executed on a computing device may include, but is not limited to, receiving, at a host computing device, a request to copy data from a source Non-Volatile Memory Express (NVMe) namespace directly accessible by a source storage controller to a destination NVMe namespace directly accessible by a destination storage controller and may determine whether the destination storage controller can directly access the source NVMe namespace. In response to determining that the destination storage controller cannot directly access the source NVMe namespace, a first identifier associated with the data may be generated via the source storage controller. The first identifier may be provided to the host computing device. A data handle associated with the first identifier may be generated via the destination storage controller. The data may be copied, via the destination storage controller, from the source NVMe namespace to the destination NVMe namespace based upon, at least in part, the data handle.

One or more of the following example features may be included. In response to determining that the destination storage controller can directly access the source NVMe namespace, the copy command may be sent, via the host computing device, to the destination storage controller with the source NVMe namespace. The source NVMe namespace and the destination NVMe namespace may be within the same NVM subsystem. The source NVMe namespace and the destination NVMe namespace may be within separate NVM subsystems. Generating, via the source storage controller, the first identifier associated with the data may include generating a representation of data (ROD) token associated with the data. Generating, via the destination storage controller, the data handle associated with the first identifier may include receiving, at the destination storage controller, a command from the host computing device to create the data handle, where the command may include the first identifier; and returning, via the destination storage controller, a data handle identifier associated with the data handle to the host computing device. Copying, via the destination storage controller, the data from the source NVMe namespace to the destination NVMe namespace based upon, at least in part, the data handle may include sending, via the host computing device, the copy command to the destination storage controller with the data handle identifier; providing, via the destination storage controller, the first identifier to the source storage controller; and, in response to providing the first identifier to the source storage controller, copying, via the destination storage controller, the data from the source NVMe namespace to the destination NVMe namespace.

In another example implementation, a computer program product resides on a computer readable medium that has a plurality of instructions stored on it. When executed by a processor, the instructions cause the processor to perform operations that may include, but are not limited to, receiving, at a host computing device, a request to copy data from a source Non-Volatile Memory Express (NVMe) namespace directly accessible by a source storage controller to a destination NVMe namespace directly accessible by a destination storage controller and may determine whether the destination storage controller can directly access the source NVMe namespace. In response to determining that the destination storage controller cannot directly access the source NVMe namespace, a first identifier associated with the data may be generated via the source storage controller. The first identifier may be provided to the host computing device. A data handle associated with the first identifier may be generated via the destination storage controller. The data may be copied, via the destination storage controller, from the source NVMe namespace to the destination NVMe namespace based upon, at least in part, the data handle.

One or more of the following example features may be included. In response to determining that the destination storage controller can directly access the source NVMe namespace, the copy command may be sent, via the host computing device, to the destination storage controller with the source NVMe namespace. The source NVMe namespace and the destination NVMe namespace may be within the same NVM subsystem. The source NVMe namespace and the destination NVMe namespace may be within separate NVM subsystems. Generating, via the source storage controller, the first identifier associated with the data may include generating a representation of data (ROD) token associated with the data. Generating, via the destination storage controller, the data handle associated with the first identifier may include receiving, at the destination storage controller, a command from the host computing device to create the data handle, where the command may include the first identifier; and returning, via the destination storage controller, a data handle identifier associated with the data handle to the host computing device. Copying, via the destination storage controller, the data from the source NVMe namespace to the destination NVMe namespace based upon, at least in part, the data handle may include sending, via the host computing device, the copy command to the destination storage controller with the data handle identifier; providing, via the destination storage controller, the first identifier to the source storage controller; and, in response to providing the first identifier to the source storage controller, copying, via the destination storage controller, the data from the source NVMe namespace to the destination NVMe namespace.

In another example implementation, a computing system includes at least one processor and at least one memory architecture coupled with the at least one processor, wherein the at least one processor is configured to receive, at a host computing device, a request to copy data from a source Non-Volatile Memory Express (NVMe) namespace directly accessible by a source storage controller to a destination NVMe namespace accessible by a destination storage controller. The at least one processor may be further configured to determine whether the destination storage controller can directly access the source NVMe namespace. The at least one processor may be further configured to, in response to determining that the destination storage controller cannot directly access the source NVMe namespace, generate, via the source storage controller, a first identifier associated with the data, wherein the processor is further configured to provide the first identifier to the host computing device. The at least one processor may be further configured to generate, via the destination storage controller, a data handle associated with the first identifier. The at least one processor may be further configured to copy, via the destination storage controller, the data from the source NVMe namespace to the destination NVMe namespace based upon, at least in part, the data handle.

One or more of the following example features may be included. In response to determining that the destination storage controller can directly access the source NVMe namespace, the copy command may be sent, via the host computing device, to the destination storage controller with the source NVMe namespace. The source NVMe namespace and the destination NVMe namespace may be within the same NVM subsystem. The source NVMe namespace and the destination NVMe namespace may be within separate NVM subsystems. Generating, via the source storage controller, the first identifier associated with the data may include generating a representation of data (ROD) token associated with the data. Generating, via the destination storage controller, the data handle associated with the first identifier may include receiving, at the destination storage controller, a command from the host computing device to create the data handle, where the command may include the first identifier; and returning, via the destination storage controller, a data handle identifier associated with the data handle to the host computing device. Copying, via the destination storage controller, the data from the source NVMe namespace to the destination NVMe namespace based upon, at least in part, the data handle may include sending, via the host computing device, the copy command to the destination storage controller with the data handle identifier; providing, via the destination storage controller, the first identifier to the source storage controller; and, in response to providing the first identifier to the source storage controller, copying, via the destination storage controller, the data from the source NVMe namespace to the destination NVMe namespace.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
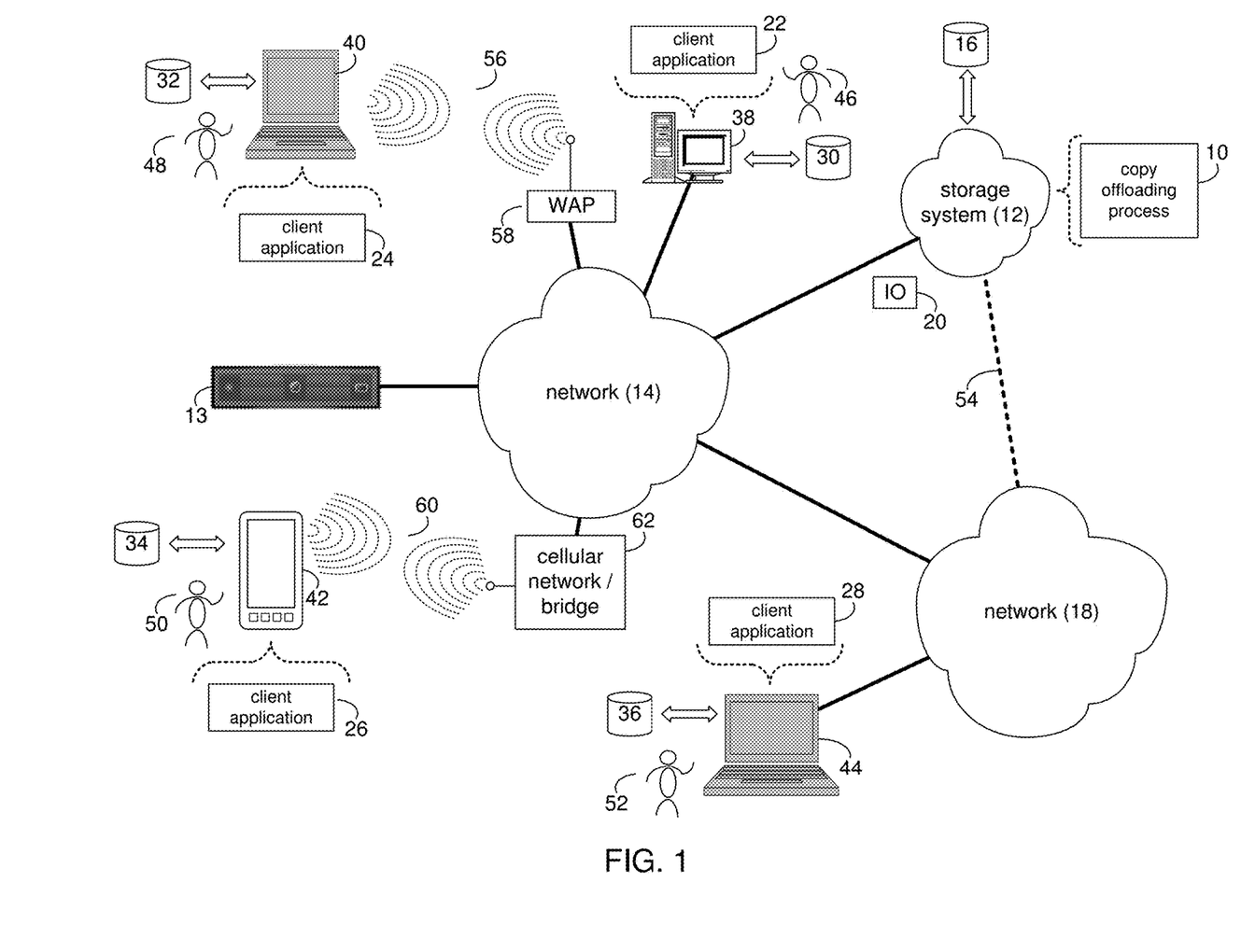
FIG. 1 is an example diagrammatic view of a storage system and a copy offloading process coupled to a distributed computing network according to one or more example implementations of the disclosure.

System Overview:

Referring to FIG. 1, there is shown copy offloading process 10 that may reside on and may be executed by storage system 12 and/or one or more host computing devices (e.g., host computing device 13) coupled to storage system 12, which may be connected to network 14 (e.g., the Internet or a local area network). In some implementations, host computing device 13 may generally include a computing device configured to access one or more storage systems. In one example, host computing device 13 may be a VMWare ESXi® hypervisor configured to deploy and serve virtual machines. However, it will be appreciated that any computing device may be used as host computing device 13 within the scope of the present disclosure.

Examples of storage system 12 may include, but are not limited to: a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of copy offloading process 10, which may be stored on storage device 16 included within storage system 12, may be executed by one or more processors (not shown) and one or more memory architectures (not shown) included within storage system 12. Storage device 16 may include but is not limited to: hard disk drives; tape drives; optical drives; RAID devices; random access memories (RAM); read-only memories (ROM), and all forms of flash and other solid state memory storage devices. Additionally/alternatively, some portions of the instruction sets and subroutines of copy offloading process 10 may be stored on storage devices (and/or executed by processors and memory architectures) that are external to storage system 12.

For example, the instruction sets and subroutines of copy offloading process 10, may (in addition to storage system 12) be stored on storage devices included within host computing device 13, may be executed by one or more processors (not shown) and one or more memory architectures (not shown)

included within host computing device 13. Storage devices within host computing device 13 may include but is not limited to: hard disk drives; tape drives; optical drives; RAID devices; random access memories (RAM); read-only memories (ROM), and all forms of flash and other solid state memory storage devices. Additionally/alternatively, some portions of the instruction sets and subroutines of copy offloading process 10 may be stored on storage devices (and/or executed by processors and memory architectures) that are external to storage system 13.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash and other solid state memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, and/or Wi-Fi, device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a copy offloading process, such as copy offloading process 10 of FIG. 1, may include but is not limited to, receiving, at a host computing device, a request to copy data from a source Non-Volatile Memory Express (NVMe) namespace directly accessible by a source storage controller to a destination NVMe namespace directly accessible by a destination storage controller and may determine whether the destination storage controller can directly access the source NVMe namespace. In response to determining that the destination storage controller cannot directly access the source NVMe namespace, a first identifier associated with the data may be generated via the source storage controller. The first identifier may be provided to the host computing device. A data handle associated with the first identifier may be generated via the destination storage controller. The data may be copied, via the destination storage controller, from the source NVMe namespace to the destination NVMe namespace based upon, at least in part, the data handle.

For example purposes only, storage system 12 will be described as being a network-based storage system that includes a plurality of electro-mechanical hard disk drives and/or solid-state/flash devices. However, this is for example purposes only and is not intended to be a limitation of this disclosure, as other configurations are possible and are considered to be within the scope of this disclosure.

Figure 2:
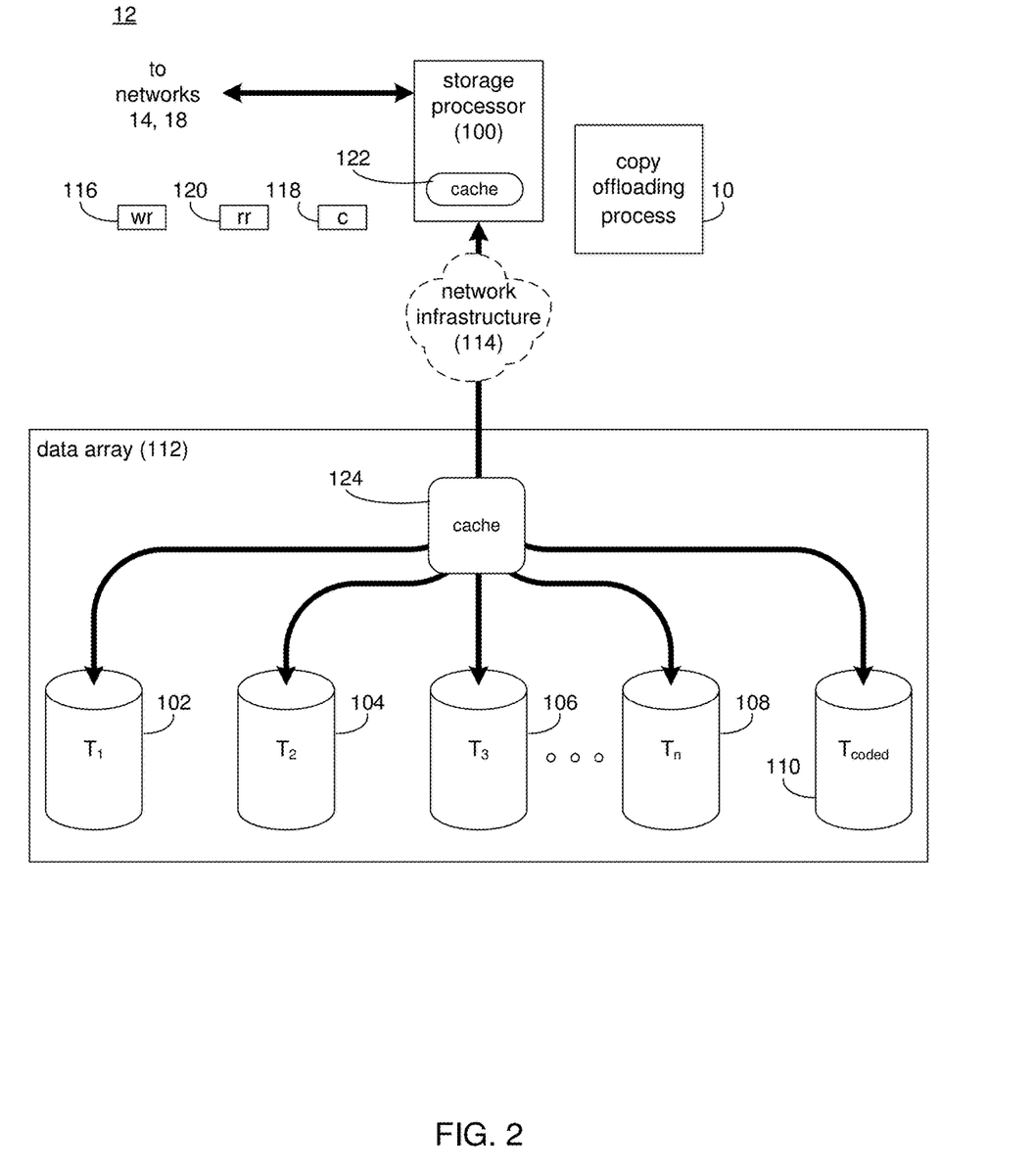
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of copy offloading process 10. The instruction sets and subroutines of copy offloading process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of copy offloading process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of copy offloading process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of copy offloading process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
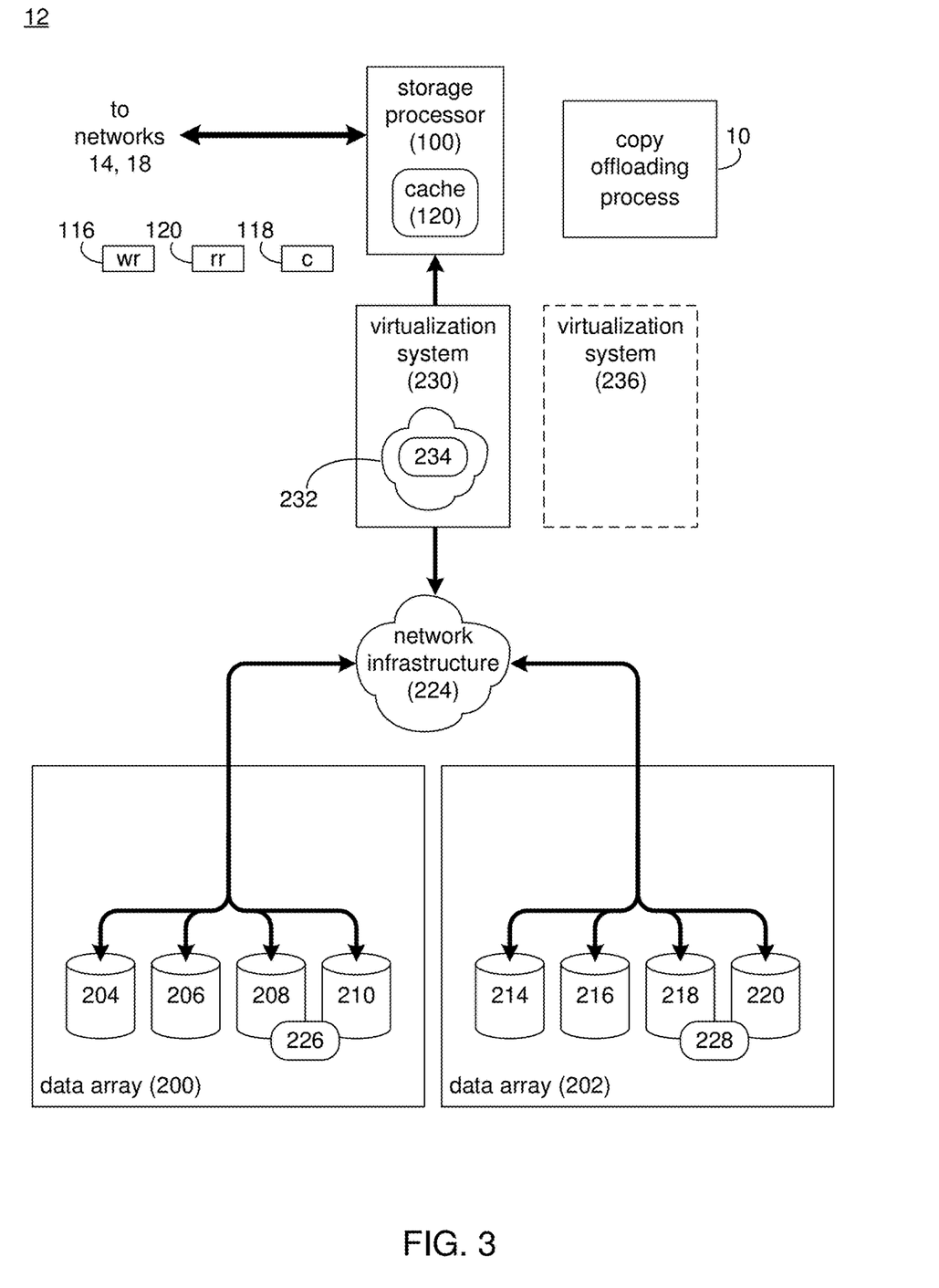

Referring also to FIG. 3, there is shown another implementation of storage system 12 that includes two separate and distinct data arrays (e.g., data arrays 200, 202). For illustrative purposes only, the first data array (e.g., data array 200) is shown to include four storage targets (e.g., storage targets 204, 206, 208, 210) and backend cache memory system 212. Further, the second data array (e.g., data array 202) is shown to include four storage targets (e.g., storage targets 214, 216, 218, 220) and backend cache memory system 222. Storage processor 100, data array 200 and data array 202 may be coupled using network infrastructure 224, examples of which may include but are not limited to a PCI Express® (PCIe®) bus, Ethernet (e.g., Layer 2 or Layer 3)

network, a fiber channel network, an InfiniBand network, or any other circuit switched/packet switched network.

For the following example, assume that data arrays 200, 202 may include functionality that may be configured to define and expose one or more namespaces or logical units (e.g., a collection of logical block addresses (LBA) accessible to host software) that users of storage processor 100 may use and access to store data. Specifically, assume that data array 200 is organized using the Non-Volatile Memory Express (NVMe) storage protocol. As is known in the art, NVMe or NVM Express® is a specification defining how host software communicates with non-volatile memory across a PCI Express® (PCIe®) bus and/or NVMe over Fabrics and may expose portions of storage as one or more namespaces. Accordingly, data array 200 may define and expose namespace 226 that may allow for the storage of data within data array 200.

In some implementations and as will be discussed in greater detail below, data from namespace 226 may be copied from data array 200 to namespace 228 of data array 202, which may be required for various reasons (e.g., maintenance of data array 200, one or more components of data array 200 being decommissioned, one or more components of data array 200 being sold/coming off lease or load balancing between data arrays, when a user is interested in creating a "clone" of a virtual machine, or is doing a migration operation of a virtual machine and its disk files from one NVMe namespace to another while the virtual machine is running (e.g., via VMware® Storage vMotion across NVMe namespaces), with either clustered file system datastores (e.g., VMware® VMFS) or virtual volumes (e.g., via VMware® virtual volume technology)). Accordingly, the host will be forced to do a host-based copy for such cases. This has significant impacts on host performance and copy performance of the storage system. While examples of particular operations (e.g., cloning and migration of virtual machines from one NVMe namespace to another) have been described, it will be appreciated that various operations that may include copying data from one NVMe namespace to another may be performed within the scope of the present disclosure.

Figure 4:
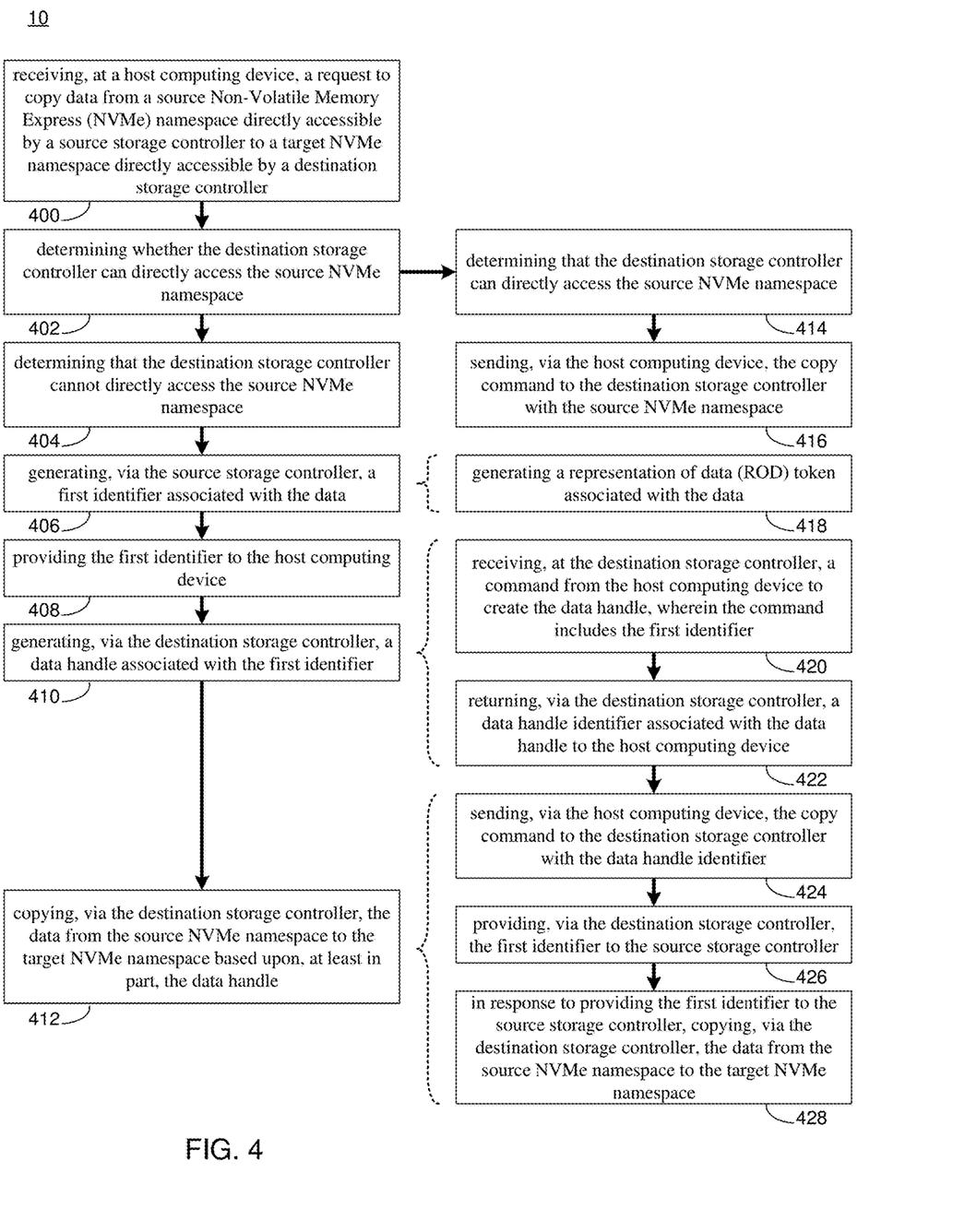
FIG. 4 is an example flowchart of copy offloading process according to one or more example implementations of the disclosure.
Figure 5:
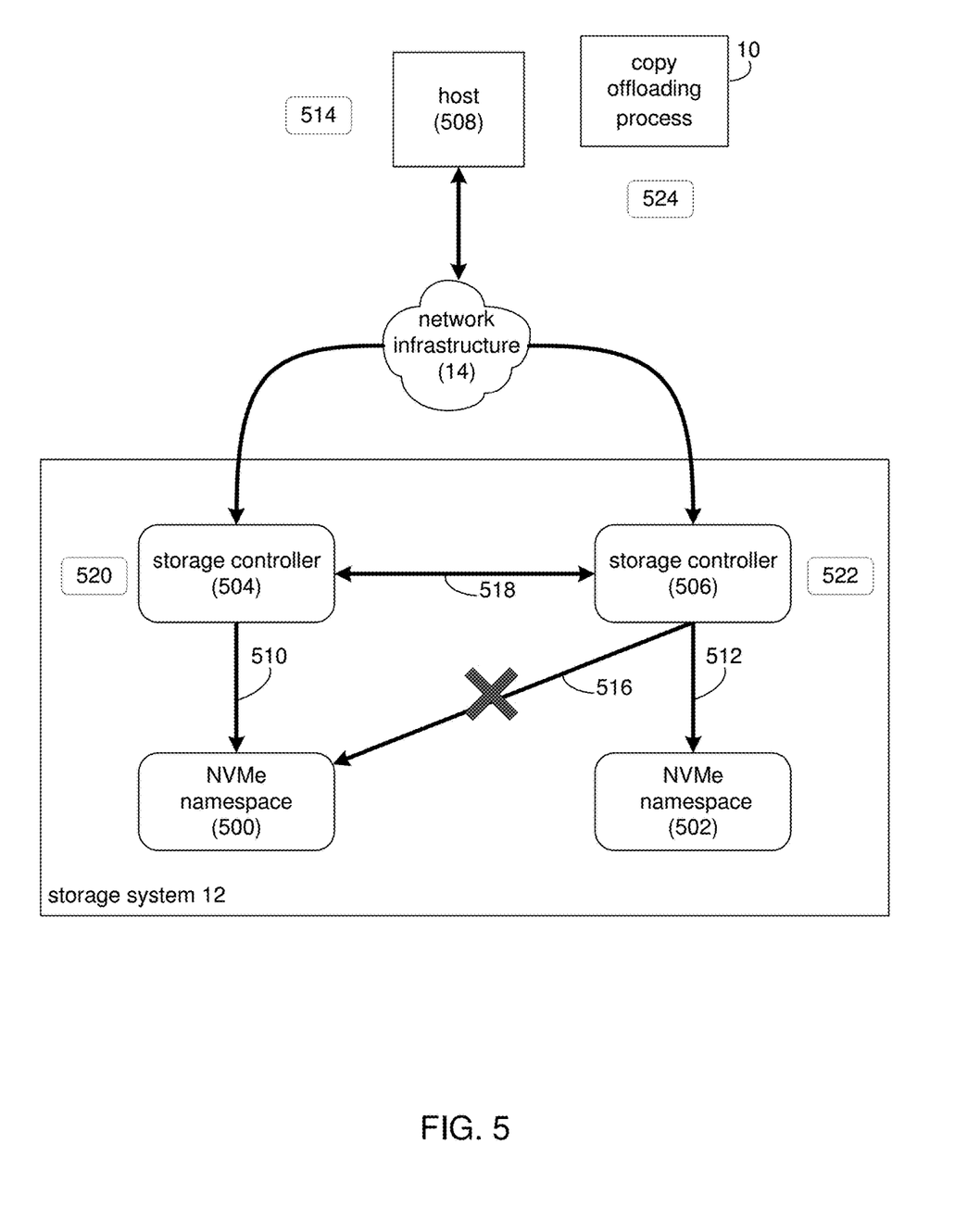
FIGS. 5-6 are example diagrammatic views of the storage system of FIG. 1 according to one or more example implementations of the disclosure.
Figure 6:
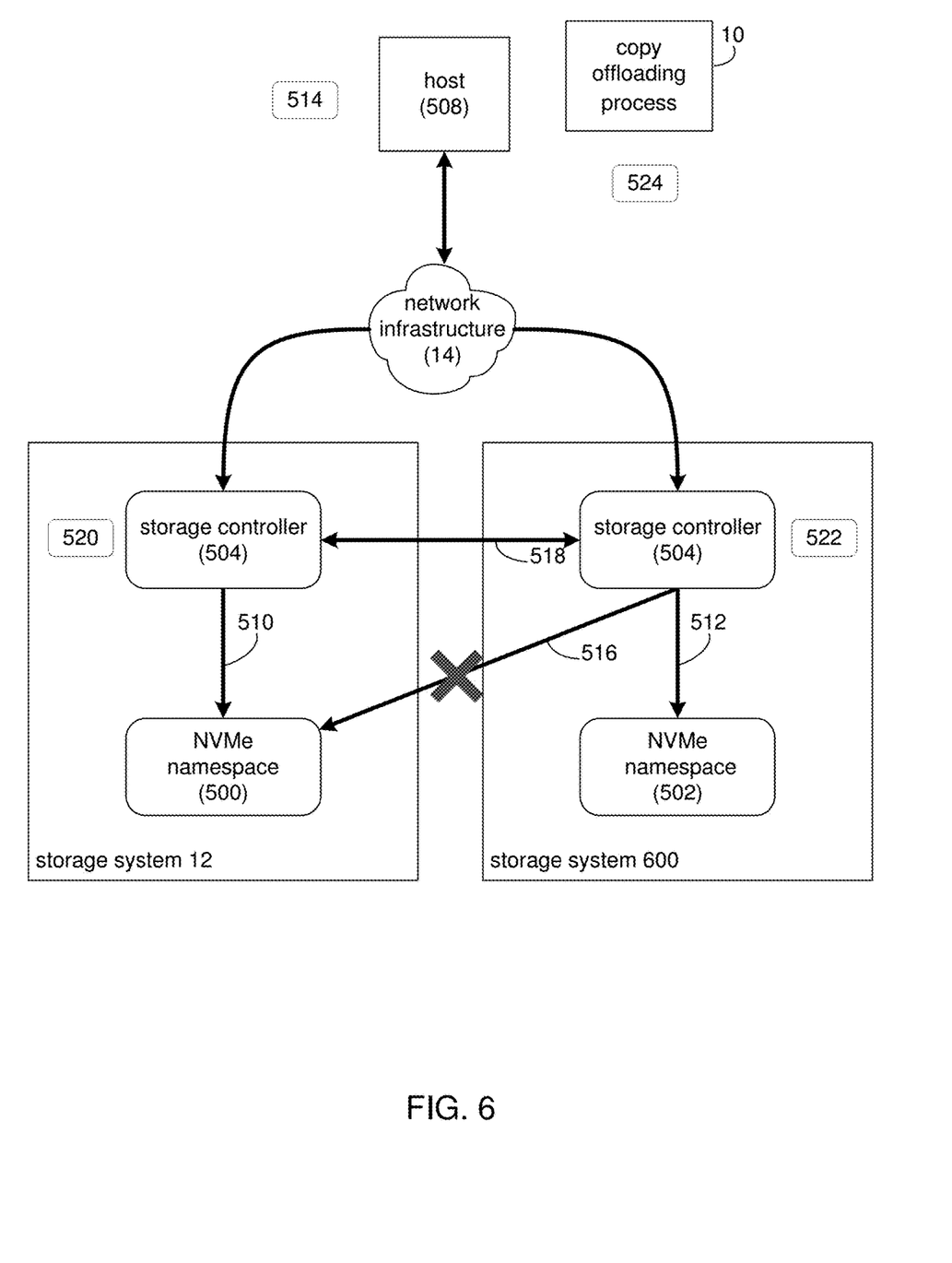

The Copy Offloading Process:

Referring also to the examples of FIGS. 4-6 and in some implementations, copy offloading process 10 may receive 400, at a host computing device, a request to copy data, from a source Non-Volatile Memory Express (NVMe) namespace that is directly accessible by a source storage controller, to a destination NVMe namespace directly accessible by the destination storage controller and may determine 402 whether the destination storage controller can directly access the source NVMe namespace. In response to determining 404 that the destination storage controller cannot directly access the source NVMe namespace, a first identifier associated with the data may be generated 406 via the source storage controller. The first identifier may be provided 408 to the host computing device. A data handle associated with the first identifier may be generated 410 via the destination storage controller. The data may be copied 412, via the destination storage controller, from the source NVMe namespace to the destination NVMe namespace based upon, at least in part, the data handle.

As will be discussed in greater detail below, implementations of the present disclosure may allow for offloading of copy commands across NVMe namespaces. As discussed above, multiple storage systems with multiple storage arrays may allow client devices to perform various types of operations where data may be moved between various storage spaces within the multiple storage arrays. Non-volatile Memory Express (NVMe) is a storage protocol that provides access to storage volumes called namespaces. However, when utilizing NVMe for copy operations across namespaces, conventional copy commands require a host computing device to read the data from a source storage location and write the data from the host computing device to a target storage location. Accordingly, the use of a host computing device to perform copy operations between namespaces is inefficient. As will be discussed in greater detail below, implementations of the present disclosure may offload copy processing from a host computing device to a data array or set of data arrays. In this manner, the functionality of the host computing device may be improved by avoiding the expenditure of host CPU cycles and other resources (e.g., virtual memory, network bandwidth, etc.) on copy commands and instead using those resources for user applications.

In some implementations, copy offloading process 10 may receive 400, at a host computing device, a request to copy data from a source Non-Volatile Memory Express (NVMe) namespace directly accessible by a source storage controller to a destination NVMe namespace directly accessible by a destination storage controller. Referring also to FIG. 5 and as discussed above, NVMe or NVM Express® is a specification defining how host software communicates with non-volatile memory across a PCI Express® (PCIe®) bus. A NVMe namespace may generally include a collection of logical block addresses (LBA) accessible to host software that users of storage processor 100 and/or client electronic devices 38, 40, 42, 44 may access to store data. In some implementations, NVMe namespaces (e.g., NVMe namespaces 500, 502) may be exposed or accessible to a host computing device via a storage controller.

As is known in the art, a storage controller (e.g., storage controllers 504, 506) or NVMe controller may be a hardware module, a software module, and/or a combination of hardware and software created during the host connection process (i.e., connection of host 508 with storage system 12). In some implementations, a host computing device (e.g., host 508) may generally include a computing device configured to access one or more storage systems (e.g., storage system 12 as shown in FIG. 5 and storage system 600 as shown in FIG. 6). In one example, host 508 may be a VMWare ESXi® hypervisor configured to deploy and serve virtual machines. However, it will be appreciated that any computing device may be used within the scope of the present disclosure.

Storage controllers 504, 506 may provide an access path between a host (e.g., host 508) and the namespaces in a storage system. As shown in the example of FIG. 5, storage controller 504 may provide an access path (e.g., access path 510) to namespace 500 and storage controller 506 may provide an access path (e.g., access path 512) to namespace 502. While an example of e.g., two storage controllers and one namespace for each storage controller has been shown, it will be appreciated that any number of storage controllers and/or namespaces are within the scope of the present disclosure.

As will be described in greater detail below, a source NVMe namespace may be an NVMe namespace from which data is to be copied from in response to a copy command. Accordingly, the storage controller that provides the access path to the source NVMe namespace may be referred to as a source storage controller within the scope of the present disclosure. Similarly, a target NVMe namespace may be an NVMe namespace to which data is to be copied in response to the copy command. Accordingly, the storage controller that provides the access path to the destination NVMe namespace may be referred to as a destination storage controller within the scope of the present disclosure. In some implementations, the source NVMe namespace may be directly accessible to both the source storage controller and the destination storage controller and the destination NVMe namespace may be directly accessible to both the source storage controller and the destination storage controller.

However, and as will be discussed in greater detail below, in some implementations, the source NVMe namespace may be inaccessible (e.g., not directly accessible) to the destination storage controller. As discussed above, when performing copy commands or operations from the source NVMe namespace to the destination NVMe namespace via conventional NVMe copy techniques, the destination storage controller may be unable to directly access the source NVMe namespace and the host computing device may be required to read the data from the source NVMe namespace and write the data to the destination NVMe namespace.

In some implementations and prior to processing copy commands as will be described in greater detail below, copy offloading process 10 may perform various preparatory security authorizations for allowing the source storage controller and the destination storage controller to communicate and to make data from source NVMe namespace data available remotely (e.g., at a destination NVMe namespace). In this manner, the destination storage controller may be authorized for communicating with the source storage controller to access data from a source NVMe namespace.

As discussed above, data from namespace 500 may be copied from data array 200 to namespace 502 of data array 202, which may be required for various reasons (e.g., maintenance of data array 200, one or more components of data array 200 being decommissioned, one or more components of data array 200 being sold/coming off lease or load balancing between data arrays, when a user is interested in creating a "clone" of a virtual machine or is doing a migration operation of a virtual machine and its disk files from one NVMe namespace to another while the virtual machine is running (e.g., via VMware® Storage vMotion across NVMe namespaces), with either clustered file system datastores (e.g., VMware® VMFS) or virtual volumes (e.g., via VMware® virtual volume technology)).

In one example, copy offloading process 10 may receive 400, at a host computing device (e.g., host 508), a request to copy data from a source NVMe namespace (e.g., NVMe namespace 500) directly accessible by a source storage controller (e.g., source storage controller 504) to a destination NVMe namespace (e.g., NVMe namespace 502) directly accessible by a destination storage controller (e.g., destination storage controller 506). For example, host 508 may receive a request to copy from a client device and/or host 508 may otherwise determine that data is to be copied between NVMe namespaces. In this example, NVMe namespace 500 may be referred to as source NVMe namespace 500 and NVMe namespace 502 may be referred to as destination NVMe namespace 502. Similarly, storage controller 504 may be referred to as source storage controller 504 and storage controller 506 may be referred to as destination storage controller 506. In some implementations, destination storage controller 506 may receive 400 the request to copy from the host computing device (e.g., host 508). In some implementations, the request to copy may include a copy command (e.g., copy command 514) to create a copy of all or at least a portion of source NVMe namespace 500.

In some implementations, copy offloading process 10 may determine 402 whether the destination storage controller can directly access the source NVMe namespace. For example and in response to receiving 400, at a host computing device (e.g., host 508), a request to copy data from a source NVMe namespace (e.g., NVMe namespace 500) directly accessible by a source storage controller (e.g., source storage controller 504) to a destination NVMe namespace (e.g., NVMe namespace 502) directly accessible by a destination storage controller (e.g., destination storage controller 506), copy offloading process 10 may determine 402 whether the destination storage controller 506 can directly access source NVMe namespace 500.

In some implementations, copy offloading process 10 may determine whether destination storage controller 506 has an access path (e.g., access path 516) to source NVMe namespace 500. For example, copy offloading process 10 may determine whether source NVMe namespace 500 is included in a list of NVMe namespaces directly accessible to destination storage controller 506. As will be discussed in greater detail below, depending upon the configuration of storage controllers and data arrays, an NVMe namespace may or may not be directly accessible by a storage controller.

In some implementations, the source NVMe namespace and the destination NVMe namespace may be within the same NVM subsystem. Referring again to the example of FIG. 5 and in some implementations, suppose storage system 12 is a multi-appliance cluster configuration. In this example, source NVMe namespace 500 may be in a first storage appliance and destination storage controller 506 may be in a second storage appliance making source NVMe namespace 500 inaccessible (e.g., not directly accessible) to controllers in the second storage appliance even though both storage appliances are part of a single NVM subsystem (e.g., a common set of NVMe storage devices). In some implementations, source storage controller 504 may be communicatively coupled within data array 200 (e.g., via link 518) to destination storage controller 506.

In some implementations, the source NVMe namespace and the destination NVMe namespace may be within separate NVM subsystems. Referring also to FIG. 6 and in some implementations, host 508 may have access to multiple NVM subsystems. In one example, each NVM subsystem may be located in a separate and distinct storage system (e.g., storage systems 12, 600). While FIG. 6 shows two storage systems or NVM subsystems, it will be appreciated that any number of NVM subsystems may be used within the scope of the present disclosure. In some implementations, storage systems 12, 600 may include separate sets of NVMe storage devices. In this manner, destination storage controller 506 of storage system 12 may not have a direct access path (e.g., access path 516) to source NVMe namespace 500 of storage system 600. However, source storage controller 504 and destination storage controller 506 may be communicatively coupled via link 518 across data arrays. Accordingly, source storage controller 504 and destination storage controller 506 may be configured to communicate without having direct access to the NVMe namespaces that are accessible to the other storage controller.

In some implementations and in response to determining 414 that the destination storage controller can directly access the source NVMe namespace, copy offloading process 10 may send 416, via the host computing device, the copy command to the destination storage controller with the source NVMe namespace. Referring again to FIG. 5 and in some implementations, suppose that destination storage controller 506 can directly access source NVMe namespace 500. In this example, copy offloading process 10 may offload the copy processing from host 508 to destination storage controller 506 as destination storage controller 506 can directly access the data from source NVMe namespace 500. As will be discussed in greater detail below, offloading copy processing from host 508 may include offloading a copy command received at host 508 to destination storage controller 506.

In some implementations and in response to determining 404 that the destination storage controller cannot directly access the source NVMe namespace, copy offloading process 10 may generate 406, via the source storage controller, a first identifier associated with the data. As will be discussed in greater detail below and in some implementations, when the destination storage controller is unable to directly access the source NVMe namespace, copy offloading process 10 may generate a local reference (e.g., local to source storage controller) for the data specified in the copy command. For example, copy offloading process 10 may generate a first identifier (e.g., first identifier 520) associated with the data. First identifier 520 may generally include a reference to the location of the data within source NVMe namespace 500. In some implementations and as discussed above, the request to copy may include a copy command (e.g., copy command 514) to create a copy of all or at least a portion of source NVMe namespace 500. Accordingly, first identifier 520 may include a reference to the portion or entirety of source NVMe namespace specified by a request to copy.

In some implementations, generating 406, via the source storage controller, the first identifier associated with the data may include generating 418 a representation of data (ROD) token associated with the data. As is known in the art in the context of the SCSI protocol, particularly SCSI Primary Commands (SPC), a representation of data (ROD) token may generally include a small identifier (e.g., a 512-byte identifier) for a portion of data within a storage system. In some implementations, generating 406 the first identifier may include sending, via the host computing device, a request to the source storage controller to generate the first identifier associated with the data. For example, host 508 may send a request (e.g., via an NVMe administration command on the NVMe administration queue) that includes a host-generated list identifier that is unique for a particular connection between the host computing device (e.g., host 508) and the destination storage controller (e.g., destination storage controller 506).

In response to receiving the request from the host computing device to generate the first identifier, copy offloading process 10 may, via source storage controller 504, generate 406 a first identifier associated with the data of the copy command from source NVMe namespace 500. In some implementations, copy offloading process 10 may generate 418 a ROD token (e.g., first identifier 520) associated with the data of source NVMe namespace 500. As discussed above and in some implementations, the ROD token (e.g., first identifier 520) may be specific to at least a portion or range of data of source NVMe namespace 500.

In some implementations, when generating 406 first identifier 520, copy offloading process 10 may define whether first identifier 520 is a persistent or a non-persistent entity. In some implementations, copy offloading process 10 may define an expiration time or date associated with first identifier 520. For example, copy offloading process 10 may receive (e.g., via a user selection via a user interface, an automatic or default selection via copy offloading process 10, etc.) a predefined expiration time or date for first identifier 520. In one example, first identifier 520 may expire after e.g., 30 to 60 minutes of inactivity. However, it will be appreciated that any expiration time or date may be defined within the scope of the present disclosure.

In some implementations, copy offloading process 10 may provide 408 the first identifier to the host computing device. For example, in response to generating 406 the first identifier, copy offloading process 10 may send a request from the host computing device to the source storage controller to obtain the first identifier. Returning to the above example, suppose copy offloading process 10 generates 418 a ROD token associated with data from source NVMe namespace 500 (e.g., first identifier 520). In this example, copy offloading process 10 may send a request (e.g., via an NVMe administration command on the NVMe administration queue) from host 508 to source storage controller 504 to obtain first identifier 520 associated with source NVMe namespace 500. Copy offloading process 10 may, via source storage controller 504, provide 408 first identifier 520 to host 508. In some implementations, source storage controller 504 may pass a list identifier to identify a prior issued request from host 508 to generate a first identifier, in order to retrieve the first identifier that was generated by the prior request from host 508.

In some implementations, copy offloading process 10 may generate 410, via the destination storage controller, a data handle associated with the first identifier. A data handle may generally include a representation or reference to data within a source NVMe namespace or specified by a ROD token that is otherwise not directly accessible by a destination storage controller. As will be discussed in greater detail below, the data handle may provide a reference to the first identifier to remove any additional complexity to a NVMe copy command when offloading copy commands across NVMe namespaces.

In some implementations, generating 410, via the destination storage controller, the data handle associated with the first identifier may include receiving 420, at the destination storage controller, a command from the host computing device to create the data handle, wherein the command includes the first identifier. For example, copy offloading process 10 may send a request (e.g., via an NVMe administration command on the NVMe administration queue) from host 508 to destination storage controller 506 to request that destination storage controller 506 generate 410 a data handle associated with the first identifier. In one example, copy offloading process 10 may send first identifier 520 (e.g., a ROD token associated with data from source NVMe namespace) to destination storage controller 506 to generate a data handle.

In some implementations, destination storage controller 506 may generate 410 a data handle (e.g., data handle 522) as a reference to data of source NVMe namespace that is accessible to destination storage controller 506. For example and as discussed above, based on the configuration of storage system 12, copy offloading process 10 may determine 402 that source NVMe namespace is not directly accessible by destination storage controller 506. Accordingly, first identifier 520 may not be directly accessible by destination storage controller 506. In some implementations, copy offloading process 10 may generate 410 data handle 522 as a small data handle (e.g., a four byte identifier) for referring to first identifier 520. In some implementations, copy offloading process 10 may generate 410 non-persistent data handles (i.e., if there is a storage system reboot, the data handles are no longer valid, and the host computing device must recreate them). In some implementations, copy offloading process 10 may define a expiration time or date associated with data handle 522. For example, copy offloading process 10 may receive (e.g., via a user selection via a user interface, an automatic or default selection via copy offloading process 10, etc.) a predefined expiration time or data for data handle 522. In one example, data handle 522 may expire after e.g., 30 to 60 minutes of inactivity. However, it will be appreciated that any expiration time or date may be defined within the scope of the present disclosure.

For example and in response to first identifier 520 provided 408 by host 508, destination storage controller 506 may generate 410 data handle 522 as a reference to the data of source NVMe namespace 500 identified by first identifier 520. In one example, generating 410 data handle 522 may include receiving, from the host computing device, a data handle identifier (e.g., data handle identifier 524) generated by the host computing device. In this manner, destination storage controller 506 may generate 410 data handle 522 that may be referenced by the data handle identifier provided by host 508 with the request to generate data handle 522 associated with first identifier 520.

In another example, generating 410 data handle 522 may include copy offloading process 10 selecting, via destination storage controller 506, a data handle identifier (e.g., data handle identifier 524) for the data handle generated 410 by destination storage controller 506. In this example, destination storage controller 506 may select data handle identifier 524 to associate with data handle 522. In this manner, the data handle may be privately shared and referenced by a particular host computing device and destination storage controller pair.

In some implementations, generating 410, via the destination storage controller, the data handle associated with the first identifier may include returning 422, via the destination storage controller, a data handle identifier associated with the data handle to the host computing device. As discussed above and in some implementations, destination storage controller 506 may generate 410 data handle 522 and associate data handle identifier 524 with data handle 522. For example, copy offloading process 10 may select, via destination storage controller 506, a data handle identifier (e.g., data handle identifier 524) for data handle 522. In this example, copy offloading process 10 may return 422, via destination storage controller 506, data handle identifier 524 associated with data handle 522 (e.g., via a particular response sent to the NVMe completion queue entry). In another example, copy offloading process 10 may receive data handle identifier 524 with the request from host 508. In this manner, copy offloading process 10 may return 422 an indication that data handle 522 was generated 410 and is associated with data handle identifier 524 specified by host 508. While two examples of returning 422 the data handle identifier to a host computing device have been provided, it will be appreciated that various other mechanisms or processes are possible and are within the scope of the present disclosure. As will be discussed in greater detail below, with data handle 522 generated 410 by destination storage controller 506 and data handle identifier 524 known to host 508, copy offloading process 10 may, via destination storage controller 506, communicate with source storage controller 504 to access the data of source NVMe namespace referenced by first identifier 520 by providing data handle 522 to source storage controller 504.

In some implementations and as discussed above, copy offloading process 10 may return data handle identifier 524 associated with data handle 522 to the host computing device. In some implementations, data handle 522 may be "passed by reference" by returning 422 data handle identifier 524 (i.e., data handle identifier 524 is only valid for the storage system that generates data handle 522 or the host computing device for which data handle identifier 524 was issued). By contrast, first identifier 520 may be provided by the host computing device (e.g., host 508) to the destination storage controller (e.g., destination storage controller 506) when sending a request to generate data handle 522. In this manner, first identifier 520 may be "passed by value" (i.e., any host computing device may access and interpret first identifier 520). By returning 422 data handle identifier 524, the scope of data handle 522 may be limited to the host computing device that requested the generation of data handle 522. In some implementations, this approach may prevent blind guessing attacks by another host computing device that could delete a data handle using a new NVMe delete data handle command. For example, a host computing device may be configured to delete data handles of a destination storage controller by sending an NVMe delete data handle command. In this manner, the receiving destination storage controller may delete the data handle from processing further copy commands.

In some implementations, copy offloading process 10 may copy 412, via the destination storage controller, the data from the source NVMe namespace to the destination NVMe namespace based upon, at least in part, the data handle. As discussed above and in some implementations, conventional approaches to offloading NVMe copy commands to a storage system may be limited for copy commands within the same NVMe namespace. In some implementations, where a source NVMe namespace is not directly accessible by a destination storage controller, a conventional NVMe copy command cannot be offloaded to the destination storage controller. As discussed above, with a first identifier generated by the source storage controller and provided to the host computing device and a data handle generated by the destination storage controller with the first identifier, the destination storage controller may be able to obtain access to the source NVMe namespace and, as such, offload the NVMe copy command from the host computing device.

In some implementations and before processing offloaded copy command 514, copy offloading process 10 may determine whether data handle 522 has expired. As discussed above and in some implementations, data handle 522 may be defined with an expiration time or date. Suppose, for example purposes only, that data handle 522 expires before receiving 424 copy command 514. In this example, copy offloading process 10 may regenerate data handle 522 in the manner described above. In another example, copy offloading process 10 may default to host computing device-based processing of a request to copy by reading the data from source NVMe namespace 500 to host 508 and writing, via host 508, the data to destination NVMe namespace 502.

In some implementations, copying 412, via the destination storage controller, the data from the source NVMe namespace to the destination NVMe namespace based upon, at least in part, the data handle may include sending 424, via the host computing device, the copy command to the destination storage controller with the data handle identifier. For example, copy offloading process 10 may, via host 508, send 424 copy command 514 (e.g., as an NVMe IO Command) with data handle identifier 524. In this example, copy offloading process 10 may include the source NVMe namespace I.D. (NSID) and data handle identifier 524 with copy command 514. Specifically, copy offloading process 10 may include the source NVMe NSID and data handle identifier 524 as additional copy source "descriptor formats" within copy command 514. As is known in the art, a descriptor format is the format of a descriptor that contains information about the data to be copied by the copy command. In some implementations, the descriptor formats may specify the source of the data to be copied and the destination of the data to be copied. In this manner, copy offloading process 10 may include the source NVMe NSID and/or data handle identifier 524 as "descriptor formats" within copy command 514 without changing the structure of copy command 514.

In some implementations, copying 412, via the destination storage controller, the data from the source NVMe namespace to the destination NVMe namespace based upon, at least in part, the data handle may include providing 426, via the destination storage controller, the first identifier to the source storage controller. Referring again to FIG. 5 and in some implementations, while destination storage controller 506 may be unable to directly access source NVMe namespace 500 referenced by a request to copy, destination storage controller 506 may be configured to communicate (e.g., via link 518) with source storage controller 504. In some implementations and as discussed above, copy offloading process 10 may, via destination storage controller 506, use data handle identifier 524 received from host 508 to identify data handle 522 and source storage controller 504 to communicate with. In this example, copy offloading process 10 may provide 426 first identifier 520 that is associated with data handle 522 to source storage controller 504 via link 518. In some implementations, because destination storage controller 506 provides 426 source storage controller 504 with first identifier 520, source storage controller 504 may provide access to and/or a copy of source NVMe namespace 500.

In some implementations, copying 412, via the destination storage controller, the data from the source NVMe namespace to the destination NVMe namespace based upon, at least in part, the data handle may include, in response to providing the first identifier to the source storage controller, copying 428, via the destination storage controller, the data from the source NVMe namespace to the destination NVMe namespace. Continuing with the above example and in response to destination storage controller 506 providing 426 first identifier 520 to source storage controller 504, copy offloading process 10 may, via destination storage controller 506, copy 428 the data from source NVMe namespace 500 to destination NVMe namespace 502. In this manner, copy offloading process 10 may offload copy processing from a host computing device (e.g., host 508) to destination storage controller 504 even when source NVMe namespace 500 is not directly accessible via destination storage controller 506.

In some implementations and in response to a failure to generate 406 first identifier 520, a failure to generate 410 data handle 522, and/or a failure to effectuate copy command 514, copy offloading process 10 may default to reading, via host 508, the data of the copy command from source NVMe namespace 500 and writing, via host 508, the data to destination NVMe namespace. In this manner, a request to copy may be effectuated even if first identifier 520 or data handle 522 are not successfully generated or if destination storage controller 506 is unable to process copy command 514.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, at a host computing device, a request to copy data from a source Non-Volatile Memory Express (NVMe) namespace directly accessible by a source storage controller to a destination NVMe namespace directly accessible by a destination storage controller;
   determining whether the destination storage controller can directly access the source NVMe namespace; and
   in response to determining that the destination storage controller cannot directly access the source NVMe namespace:
      generating, via the source storage controller, a first identifier associated with the data;
      providing the first identifier to the host computing device;
      generating, via the destination storage controller, a data handle associated with the first identifier; and
      copying, via the destination storage controller, the data from the source NVMe namespace to the destination NVMe namespace based upon, at least in part, the data handle.

2. The computer-implemented method of claim 1, in response to determining that the destination storage controller can directly access the source NVMe namespace, sending, via the host computing device, the copy command to the destination storage controller with the source NVMe namespace.

3. The computer-implemented method of claim 1, wherein the source NVMe namespace and the destination NVMe namespace are within the same NVM subsystem.

4. The computer-implemented method of claim 1, wherein the source NVMe namespace and the destination NVMe namespace are within separate NVM subsystems.

5. The computer-implemented method of claim 1, wherein generating, via the source storage controller, the first identifier associated with the data includes generating a representation of data (ROD) token associated with the data.

6. The computer-implemented method of claim 1, wherein generating, via the destination storage controller, the data handle associated with the first identifier includes:
   receiving, at the destination storage controller, a command from the host computing device to create the data handle, wherein the command includes the first identifier;
   returning, via the destination storage controller, a data handle identifier associated with the data handle to the host computing device.

7. The computer-implemented method of claim 6, wherein copying, via the destination storage controller, the data from the source NVMe namespace to the destination NVMe namespace based upon, at least in part, the data handle includes:
   sending, via the host computing device, a copy command to the destination storage controller with the data handle identifier;
   providing, via the destination storage controller, the first identifier to the source storage controller; and in response to providing the first identifier to the source storage controller, copying, via the destination storage controller, the data from the source NVMe namespace to the destination NVMe namespace.

8. A computer program product residing on a non-transitory computer readable medium having a plurality of instructions stored thereon which, when executed by a processor, cause the processor to perform operations comprising:
   receiving, at a host computing device, a request to copy data from a source Non-Volatile Memory Express (NVMe) namespace directly accessible by a source storage controller to a destination NVMe namespace directly accessible by a destination storage controller;
   determining whether the destination storage controller can directly access the source NVMe namespace; and
   in response to determining that the destination storage controller cannot directly access the source NVMe namespace:
      generating, via the source storage controller, a first identifier associated with the data;
      providing the first identifier to the host computing device;
      generating, via the destination storage controller, a data handle associated with the first identifier; and
      copying, via the destination storage controller, the data from the source NVMe namespace to the destination NVMe namespace based upon, at least in part, the data handle.

9. The computer program product of claim 8, in response to determining that the destination storage controller can directly access the source NVMe namespace, sending, via the host computing device, the copy command to the destination storage controller with the source NVMe namespace.

10. The computer program product of claim 8, wherein the source NVMe namespace and the destination NVMe namespace are within the same NVM subsystem.

11. The computer program product of claim 8, wherein the source NVMe namespace and the destination NVMe namespace are within separate NVM subsystems.

12. The computer program product of claim 8, wherein generating, via the source storage controller, the first identifier associated with the data includes generating a representation of data (ROD) token associated with the data.

13. The computer program product of claim 8, wherein generating, via the destination storage controller, the data handle associated with the first identifier includes:
   receiving, at the destination storage controller, a command from the host computing device to create the data handle, wherein the command includes the first identifier;
   returning, via the destination storage controller, a data handle identifier associated with the data handle to the host computing device.

14. The computer program product of claim 13, wherein copying, via the destination storage controller, the data from the source NVMe namespace to the destination NVMe namespace based upon, at least in part, the data handle includes:
   sending, via the host computing device, a copy command to the destination storage controller with the data handle identifier;
   providing, via the destination storage controller, the first identifier to the source storage controller; and
   in response to providing the first identifier to the source storage controller, copying, via the destination storage controller, the data from the source NVMe namespace to the destination NVMe namespace.

15. A computing system comprising:
   a memory; and
   a processor configured to receive, at a host computing device, a request to copy data from a source Non-Volatile Memory Express (NVMe) namespace directly accessible by a source storage controller to a destination NVMe namespace accessible by a destination storage controller, wherein the processor is further configured to determine whether the destination storage controller can directly access the source NVMe namespace, wherein the processor is further configured to, in response to determining that the destination storage controller cannot directly access the source NVMe namespace, generate, via the source storage controller, a first identifier associated with the data, wherein the processor is further configured to provide the first identifier to the host computing device, wherein the processor is further configured to generate, via the destination storage controller, a data handle associated with the first identifier, and wherein the processor is further configured to copy, via the destination storage controller, the data from the source NVMe namespace to the destination NVMe namespace based upon, at least in part, the data handle.

16. The computing system of claim 15, in response to determining that the destination storage controller can directly access the source NVMe namespace, sending, via the host computing device, the copy command to the destination storage controller with the source NVMe namespace.

17. The computing system of claim 15, wherein the source NVMe namespace and the destination NVMe namespace are within the same NVM subsystem.

18. The computing system of claim 15, wherein the source NVMe namespace and the destination NVMe namespace are within separate NVM subsystems.

19. The computing system of claim 15, wherein generating, via the source storage controller, the first identifier associated with the data includes generating a representation of data (ROD) token associated with the data.

20. The computing system of claim 15, wherein generating, via the destination storage controller, the data handle associated with the first identifier includes:
   receiving, at the destination storage controller, a command from the host computing device to create the data handle, wherein the command includes the first identifier;
   returning, via the destination storage controller, a data handle identifier associated with the data handle to the host computing device.

* * * * *